United States Patent [19]

Sokyrka

[11] Patent Number: 5,512,122
[45] Date of Patent: Apr. 30, 1996

[54] PRINTING METHOD

[75] Inventor: Harold W. Sokyrka, Saskatchewan, Canada

[73] Assignee: Luminart Inc., Mississauga, Canada

[21] Appl. No.: 242,681

[22] Filed: May 4, 1994

Related U.S. Application Data

[63] Continuation of Ser. No. 47,133, Apr. 16, 1993, abandoned, which is a continuation-in-part of Ser. No. 962,257, Oct. 16, 1992, abandoned.

[30] Foreign Application Priority Data

Oct. 17, 1991 [CA] Canada ................................. 2053675

[51] Int. Cl.$^6$ ................................................ B32B 31/00
[52] U.S. Cl. ................................ 156/275.5; 156/275.7; 264/494; 425/87; 434/113; 40/543
[58] Field of Search .......................... 156/275.5, 275.7; 264/22; 425/87; 434/113; 40/543; 106/20 B

[56] References Cited

U.S. PATENT DOCUMENTS

| | | | |
|---|---|---|---|
| 278,958 | 6/1883 | Henay | 425/87 |
| 3,816,943 | 6/1974 | Henry . | |
| 3,853,578 | 12/1974 | Suzuki | 117/8.5 |
| 4,058,401 | 11/1977 | Crivello | 106/20 B |
| 4,208,005 | 6/1980 | Nate | 228/175 |
| 4,264,483 | 4/1981 | Laufer et al. . | |
| 4,378,215 | 3/1983 | Sparks | 434/113 |
| 4,540,644 | 9/1985 | Jacob . | |
| 4,593,051 | 6/1986 | Koleske | 522/31 |
| 4,711,044 | 12/1987 | Danjell | 40/543 |
| 4,715,743 | 12/1987 | Schmanski . | |
| 4,961,886 | 10/1990 | Eckstein et al. | 264/22 |
| 5,099,090 | 3/1992 | Allan et al. | 106/20 B |
| 5,106,288 | 4/1992 | Hughes | 264/22 |
| 5,120,476 | 6/1992 | Scholz | 156/275.5 |
| 5,151,813 | 9/1992 | Yamamoto et al. | 264/22 |
| 5,236,812 | 8/1993 | Vassiliou | 430/327 |
| 5,287,435 | 2/1994 | Cohen et al. | 264/22 |
| 5,303,141 | 4/1994 | Batchelder | 264/22 |

FOREIGN PATENT DOCUMENTS

| | | |
|---|---|---|
| 0204575 | 12/1986 | European Pat. Off. . |
| 0235914 | 9/1987 | European Pat. Off. . |
| 0432093A1 | 6/1991 | European Pat. Off. . |
| 55-23015 | 2/1980 | Japan . |

*Primary Examiner*—Chester T. Barry
*Attorney, Agent, or Firm*—Arne I. Fors; Jeffrey T. Imai; D. Doak Horne

[57] ABSTRACT

A printing compound and methods of producing 3-dimensional signs and lettering and tactile and Braille reading materials is disclosed. The printing compound includes an ultraviolet radiation curable resin and a filler mixed with the resin to form a paste. The resin can be an acrylated urethane oligomer or an epoxidized oil. The compound is applied to a substrate manually or by a computer controlled dispensing apparatus. The compound is subjected to ultraviolet radiation to cure quickly allowing for mass production.

10 Claims, 2 Drawing Sheets

PRINTING METHOD

This is a continuation of application Ser. No. 08/047,133, filed Apr. 16, 1993, now abandoned, which in turn is a continuation-in-part of application Ser. No. 07/962,257 filed Oct. 16, 1992 now abandoned.

BACKGROUND OF THE INVENTION

The present invention relates to printing compounds and methods of making 3-dimensional signs and lettering, including Braille and other tactile reading material.

FIELD OF THE INVENTION

Visually impaired individuals in preschool and early grade school and learning disabled individuals of any age are taught to read and do read using tactile materials that contain a raised image of the object being taught. Older visually impaired children, moreover, who are learning or using the Braille alphabet to read, also benefit from tactile materials that supplement and explain by being placed alongside the braille representation of the image. Consequently, tactile reading materials, whether used alone or in conjunction with Braille materials, are critical to the learning process of visually impaired and learning disabled individuals. Apart from visually impaired individuals, however, 3-dimensional or raised images have been produced for normally sighted people, such as topographical maps, anatomical displays and the like, as these items are generally considered to be more visually pleasing and informative than two-dimensional displays.

In the past, these 3-dimensional or tactile display materials, such as maps, graphs, geometric figures, letters, numbers and images—whether alone or also containing Braille lettering—have been provided using a thermoforming process. In this method, a metal or lead plate is tediously produced by hand. Following the completion of this plate, a thin plastic sheet is placed on top of the plate, and with the assistance of a thermoforming press, or vacuum forming, the sheets are formed to reproduce the original plate. Braille normally cannot be added to the resulting reproduction but must be hand-placed into the original metal plate along with the tactile image before the reproduction is made.

This entire process is extremely time-consuming and tedious and lacks accuracy and consistency. Two unfortunate results flow from these limitations. First, the commercial availability of tactile materials used in instructional use for the visually impaired and learning disabled is extremely limited. Second, without tactile materials, instructional use is often limited to Braille.

This new invention directly addresses the limitations that currently exist in producing 3-dimensional signs and lettering, including Braille and tactile images for the visually impaired and learning disabled individuals. Consistent and comprehensible reproductions can be produced in a very short time without the tedious limitation of current tactile reproduction methods. Accordingly, mass production of 3-dimensional or tactile reading material, with or without Braille lettering is possible with this invention.

SUMMARY OF THE INVENTION

The present invention provides an adhesive printing compound that can be formed into any desired image and cured quickly using ultraviolet radiation. The compound may be dispensed using computer controlled dispensing apparatus for highly accurate reproductions.

According to one aspect of the invention there is provided a method of making 3-dimensional signs and lettering comprising the steps of providing a substrate, applying an adhesive printing compound to the substrate, the compound being a gel formed of ultraviolet radiation curable resin and a filler, the printing compound being arranged in a predetermined pattern. The compound is then subjected to ultraviolet radiation to complete the sign.

DESCRIPTION OF THE DRAWINGS

Preferred embodiments of the invention will now be described by way example, with reference to the accompanying drawings, in which.

DETAILED DESCRIPTION OF THE PREFERRED EMBODIMENTS

Figure 1:
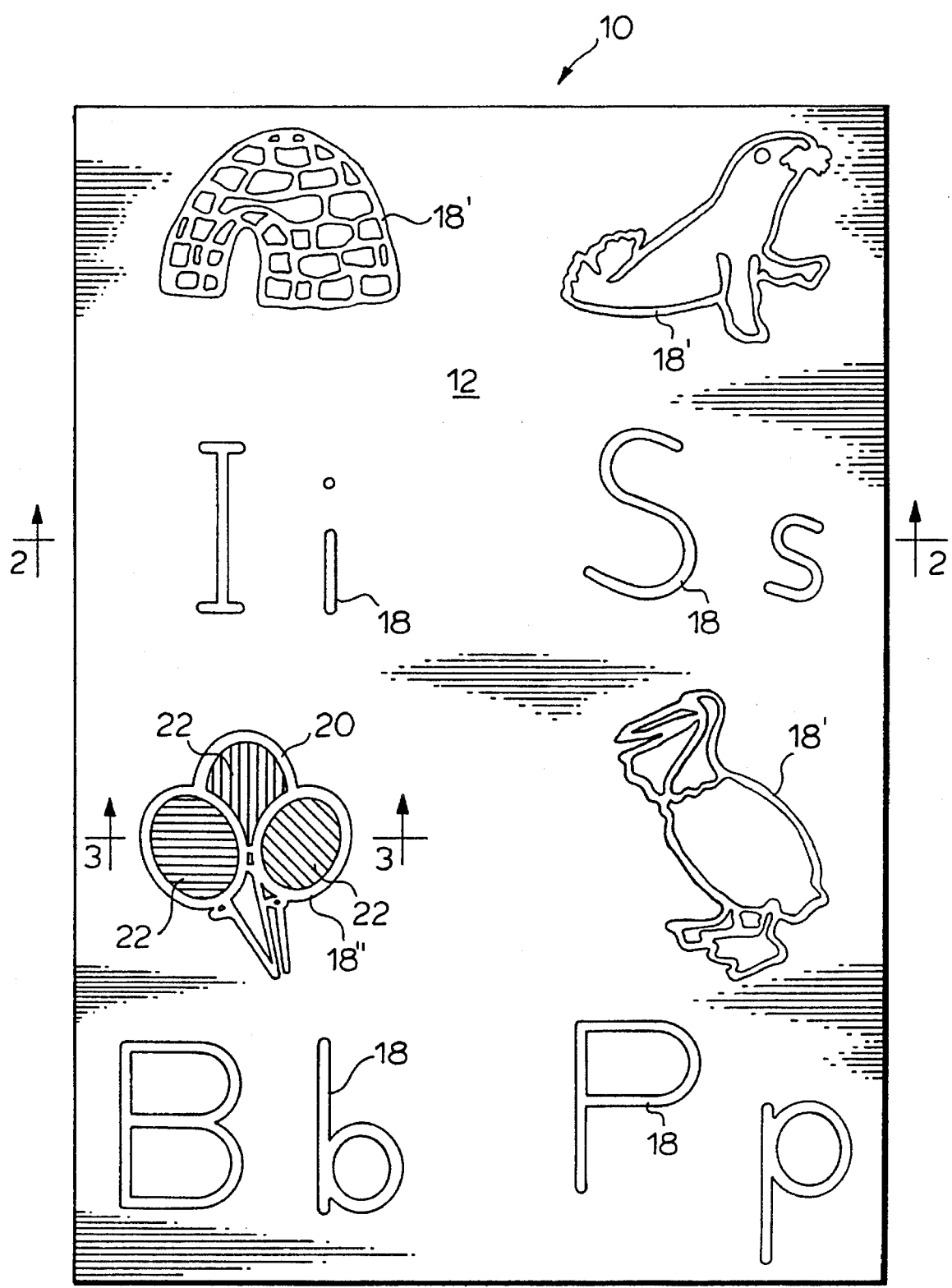
FIG. 1 is a plan view of a 3-dimensional sign showing various sample images printed in accordance with the present invention.

Referring to the drawings, a sample display sign or tactile image board is generally indicated by reference numeral 10. Display sign 10 has a plurality of images or pictures formed thereon including some alphabetical lettering, but this is for illustration purposes only. Any images, as well as numerals or letters of any alphabet, including Braille, could be used in sign 10.

Figure 2:
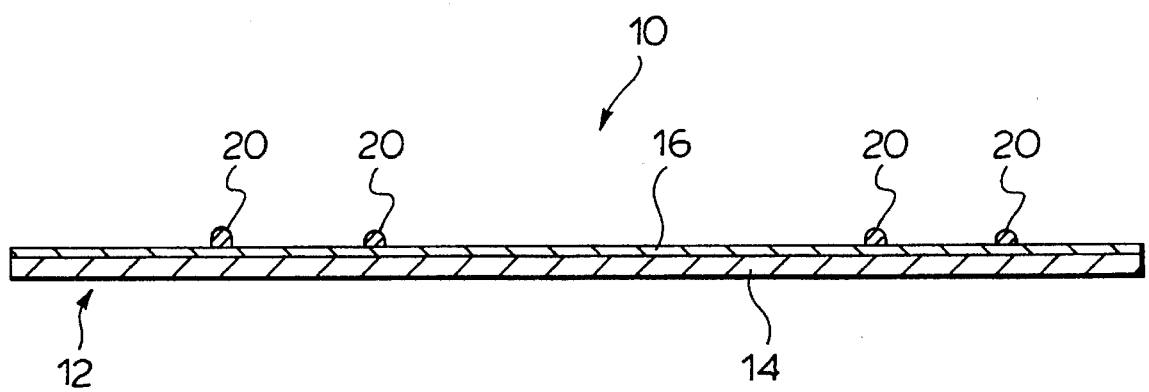
FIG. 2 is an enlarged sectional view taken along lines 2—2 of FIG. 1.
Figure 3:
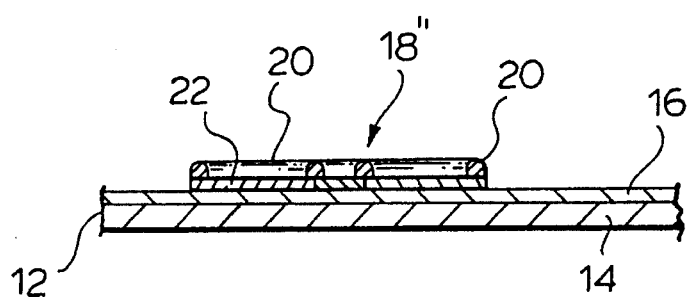
FIG. 3 is an enlarged sectional view taken along lines 3—3 of FIG. 1.

Referring in particular to FIGS. 2 and 3, display sign 10 includes a planar substrate 12 which, in the preferred embodiment, is formed of a paper layer 14 laminated to a polyvinylchloride layer 16. However, substrate 12 could be formed of any material, such as paper, cardboard, cloth, sheets of plastic, metal or wood. The only requirement is that the printing compound or adhesive material of the present invention be able to stick to substrate 12. In a preferred embodiment of the invention, the printing compound will stick to the substrate 12, such that substrate 12 does not require any special pre-treatment, preparation, or priming. If the printing compound will not stick to the basic material used for substrate 12, then the substrate can be treated such as by applying paint or primer to thee surface thereof or laminating another material onto the substrate to which the printing compound will adhere. A further alternative is to engrave or form grooves in the substrate and put the printing compound in the grooves. Further, substrate 12 does not need to be flat. It can be a rounded or curved surface or any other shape for that matter. For the purposes of this invention, the term "substrate" is intended to include any surface to which the printing compound of the present invention is applied. The only requirement is that the printing compound be visible and accessible to be cured by the application of ultraviolet radiation.

Referring again to FIGS. 1 and 2, images 18 in the form of graphic designs, letters, numerals, etc. are formed on substrate 12 preferably by laying down a bead of adhesive material or printing compound 20 either to form the letters or images in solid form or in outline as illustrated by the graphic images in FIG. 1. The graphic images are represented by primed reference numerals in the drawings. In the case of the balloon image as represented by reference numeral 18" in FIGS. 1 and 3, prior to applying printing compound 20 to substrate 12 a colored pattern 22 is printed on substrate 12 to represent the body of the balloons, and printing compound 20 is applied to substrate 12 by forming a bead of the compound on the substrate around the periphery of pattern 22. The colors of pattern 22 are chosen so that the balloons appear to be different colors. The bead of adhesive printing compound 20 can be the same color as the body of the balloons or it can be a contrasting color or even fluorescent, as desired. If the compound is fluorescent, it glows like a neon sign, especially if black light is used to illuminate the image. Any combination of printed or painted images with printing compound 20 used to highlight or accent the images may be made as desired.

The preferred method of applying printing compound 20 to substrate 12 is to use robotics or a computer controlled liquid dispensing machine. One such machine that can be adapted for use in the present invention is produced by Luminart Canada Inc. of 5865 Kennedy Road, Mississauga, Ontario, Canada, and is sold under the trade mark LUMINART. To use this machine in the present invention, the printing compound 20 is placed into airtight cartridges, each cartridge having a hole at one end to accommodate a dispensing needle. Each cartridge normally would have a different color of printing compound, although the cartridges could have the same color of compound, but have different sizes or shapes of dispensing needles to give a variety of shapes and configurations of the printing compound applied to the substrate.

The cartridges are loaded into the computer controlled liquid dispensing machine and connected to pneumatic pressure lines to force the printing compound out of the cartridges. The printing compound can be dispensed as dots or lines, the shape and thickness of which are determined by the dispensing needles and the pressure applied to the cartridges.

The Luminart liquid dispensing machine mentioned above contains a flat surface or table top 1.2 by 1.2 or 1.2 by 2.4 meters (4 by 4 or 4 by 8 feet). If it is desired to reproduce an original printed or painted work, the printed matter that is to be reproduced is placed on the flat table top and a camera built into the machine projects the image of the printed matter to be reproduced onto a monitor or television screen in the machine having x, y and z axis co-ordinates or crosshairs.

Using software built into the machine, an operator viewing the original printed matter through the co-ordinates on the television screen collects the data co-ordinates of the printed matter and instructs the computer in the machine to store them in its memory.

Since the information has been stored in the computer memory and the dispensing robot is capable of accessing this information, the operator pushes a button on the dispensing machine that instructs the robot to apply air pressure to the cartridges containing the printing compound to dispense the compound.

By controlling air flow and speed, the robot begins to dispense the printing compound by following the co-ordinates that have been stored in the computer memory. For tactile reproduction the robot would dispense the printing compound in a line formation; whereas if the original printed matter was in the form of Braille lettering the robot would dispense the compound in a series of dots.

The adhesive material or printing compound 20 is formed of two types of ultraviolet radiation curable resin mixed with a filler to form a paste or thixotropic gel of the consistency of toothpaste. The first type of ultraviolet radiation curable resin is an acrylated urethane oligomer including an ultraviolet photo-initiator. The second type is a non-toxic epoxidized oil. In Braille applications, the printing compound should be non-toxic. For other applications, such as display signs, highway signs and the like this usually does not matter. The preferred photo-initiator or curing agent is that sold under the trade mark Darocur 1173 by Ciba-Geigy. The preferred filler is amorphous fumed silica and the amount of filler used may vary between 1 and 20 percent by weight of the primary resin. For Braille and highway sign applications, the amount of filler is usually between 1 to 2 percent. For tactile and graphic arts and signage the amount of filler normally is between 7 and 9 percent. For highway sign applications, glass beads and sparkle or nacreous pigments can be added to the compound or sprinkled on top of or embedded in the compound before it is cured with the ultraviolet radiation.

Other minor components that can be added to the printing compound in percentage by weight are other monomers (4–6%) to act as reactive diluents, surface cure agents (4–6%), wax (0.25%) to reduce stringiness or tackiness, adhesion promoters (1–3%), colored powdered pigments (1–6%), fluorescent pigments (1–5%), and dyes and optical brighteners (1–5%). The percentage by volume of some of these components can vary plus or minus 20% depending on the color and viscosity desired and the curing temperature of the compound.

Once the printing compound is applied to the substrate, display sign 10 is then placed into an ultraviolet curing chamber, or the printing compound is otherwise exposed to ultraviolet radiation or light in the 350 to 400 nanometer range. The preferred wavelength is 365 nanometers. If the substrate is transparent, the ultraviolet light can be applied from behind. This is particularly advantageous where the compound is fluorescent, as mentioned above, as in this case the images formed by the compound glow like neon signs. The ultraviolet light may be produced by fluorescent black light, mercury vapor bulbs or even bright sunlight. The preferred source of ultraviolet light is fluorescent black light. Sign 10 is left in the curing chamber for between 1 and 5 minutes depending on the intensity of the light and the thickness of the printing compound. The printing compound cures to a solid form bonded to the substrate although the cured compound is flexible and somewhat resilient. Accordingly, the compound can be applied to a flexible substrate and after curing, this can be wrapped or formed around a curved surface if desired. For outdoor applications, the finished products can be coated with a clear acrylic spray to protect them from the weather.

The printing compounds and method of producing signs and lettering and Braille reading materials of the present invention, as well as many of their attendant advantages, will be understood from the foregoing description and it will be apparent that various changes may be made to the embodiments described without departing from the spirit and scope of the invention or sacrificing all of its material advantages, the embodiments hereinbefore described being merely preferred embodiments thereof.

I claim:

1. A method of making three dimensional signs comprising: providing a substrate, applying an adhesive printing compound to the substrate, wherein said substrate has not been pre-treated for adhering said compound to said sign, said compound being a gel formed of ultraviolet radiation curable resin and a filler, said printing compound being arranged in a predetermined pattern; subjecting said printing compound to ultraviolet radiation after said pre-determined pattern has been formed, whereby said printing compound adheres to said sign after subjecting said compound to ultraviolet radiation.

2. A method of making three-dimensional signs as claimed in claim 1 and further comprising the step prior to applying the compound to the substrate of mixing a dye or pigment into the compound.

3. A method of making three-dimensional signs as claimed in claim 2 wherein the pigment is fluorescent.

4. A method of making three-dimensional signs as claimed in claim 1 and further comprising the step prior to applying the compound to the substrate of mixing glass beads into the compound.

5. A method of making three-dimensional signs as claimed in claim 1 and further comprising the step prior to applying the compound to the substrate of laminating the substrate with vinyl so that the resin is applied to the vinyl.

6. A method of making three-dimensional signs as claimed in 1 and further comprising the step prior to applying the compound to the substrate of printing a pattern on the substrate, and wherein the compound is applied by forming a bead on the substrate around the periphery of the pattern.

7. A method of making three-dimensional signs as claimed in claim 1 wherein the resin includes an acrylated urethane oligomer and photo-initiator.

8. A method of making three-dimensional signs as claimed in claim 1 wherein the resin includes a non-toxic epoxidized oil.

9. A method of making three-dimensional signs as claimed in claim 1 wherein the substrate is transparent.

10. A method of making three-dimensional signs as claimed in claim 9 and further comprising the step prior to applying the compound to the substrate of mixing a fluorescent pigment into the compound.

* * * * *